US005967732A

United States Patent [19]

Floyd

[11] Patent Number: 5,967,732

[45] Date of Patent: Oct. 19, 1999

[54] LIFTING MECHANISM

[76] Inventor: Denzil L. Floyd, 2988 N. Rd., Hotchkiss, Colo. 81419

[21] Appl. No.: 09/165,492

[22] Filed: Oct. 2, 1998

Related U.S. Application Data

[60] Provisional application No. 60/061,011, Oct. 6, 1997.

[51] Int. Cl.[6] ..................... B60R 9/045

[52] U.S. Cl. ..................... 414/462; 414/543; 254/4 R; 254/6 R; 254/8 R; 254/DIG. 1

[58] Field of Search ..................... 414/462, 23, 543; 52/298, 720.1; 269/900; 254/DIG. 1, 4 R, 8 R, 6 R

[56] References Cited

U.S. PATENT DOCUMENTS

| | | | |
|---|---|---|---|
| 1,268,410 | 6/1918 | Weber | 254/DIG. 1 |
| 3,360,142 | 12/1967 | Jamison et al. | 414/23 |
| 3,917,094 | 11/1975 | Magneson | 414/462 |
| 3,952,893 | 4/1976 | Kolesar | 414/462 |
| 4,004,383 | 1/1977 | Watanabe | 52/298 |
| 4,127,200 | 11/1978 | Mann | 414/462 |
| 4,738,433 | 4/1988 | Hoff | 254/DIG. 1 |
| 5,419,672 | 5/1995 | Poe | 414/462 |
| 5,431,526 | 7/1995 | Peterson et al. | 414/462 |
| 5,662,451 | 9/1997 | Muzzi et al. | 414/462 |
| 5,752,799 | 5/1998 | Carey et al. | 414/462 |

*Primary Examiner*—Christopher P. Ellis
*Assistant Examiner*—Douglas Hess
*Attorney, Agent, or Firm*—Donald W. Erickson

[57] ABSTRACT

A lifting mechanism having special utility for snowmobiles that become stuck in the snow. The lifting mechanism enables a single person to lift the snowmobile up and to the side whereby the snowmobile track gains traction on new snow. It comprises a base plate, a vertical support of a plurality of sections, and a ratchet assembly which includes a cable for attachment to the snowmobile. The base plate is designed to facilitate side movement of the support after the snowmobile has been lifted.

6 Claims, 1 Drawing Sheet

LIFTING MECHANISM

This application claims the benefit of U.S. Provisional application Ser. No. 60/061,011, filed Oct. 6, 1997.

BACKGROUND OF THE INVENTION

This invention is directed at a portable apparatus that is very useful and convenient for lifting sport vehicles and other objects. More particularly, the apparatus of the present invention is a lifting mechanism that has special utility for sport vehicles such as snowmobiles and all terrain vehicles when the vehicle becomes stuck or mired in snow. The lifting mechanism of the present invention enables or permits a single person to lift the vehicle such as a snowmobile up and to the side. This is important because it enables the snowmobile track to come down onto fresh or undisturbed snow, in whole or part. Where the track can gain a hold and get traction sufficient to become unstuck. The lifting mechanism can be stowed compactly in or on the snowmobile so that it is available for use when the vehicle gets stuck in the snow in isolated or back country areas.

SUMMARY OF THE INVENTION

The present invention provides a portable lifting mechanism having special utility for freeing a snowmobile that has become stuck in the snow. The lifting mechanism comprises a base plate, a vertical support post made of a plurality of sections, and a ratchet assembly mounted on one of the post sections. The ratchet assembly includes a cable and a hook member or the like for attachment to the snowmobile bumper or the like. The base plate is adapted for use on a snow footing. Also, the base plate is designed to facilitate side movement of the support post after the snowmobile has been lifted.

DETAILED DESCRIPTION OF THE DRAWING

Figure 1:
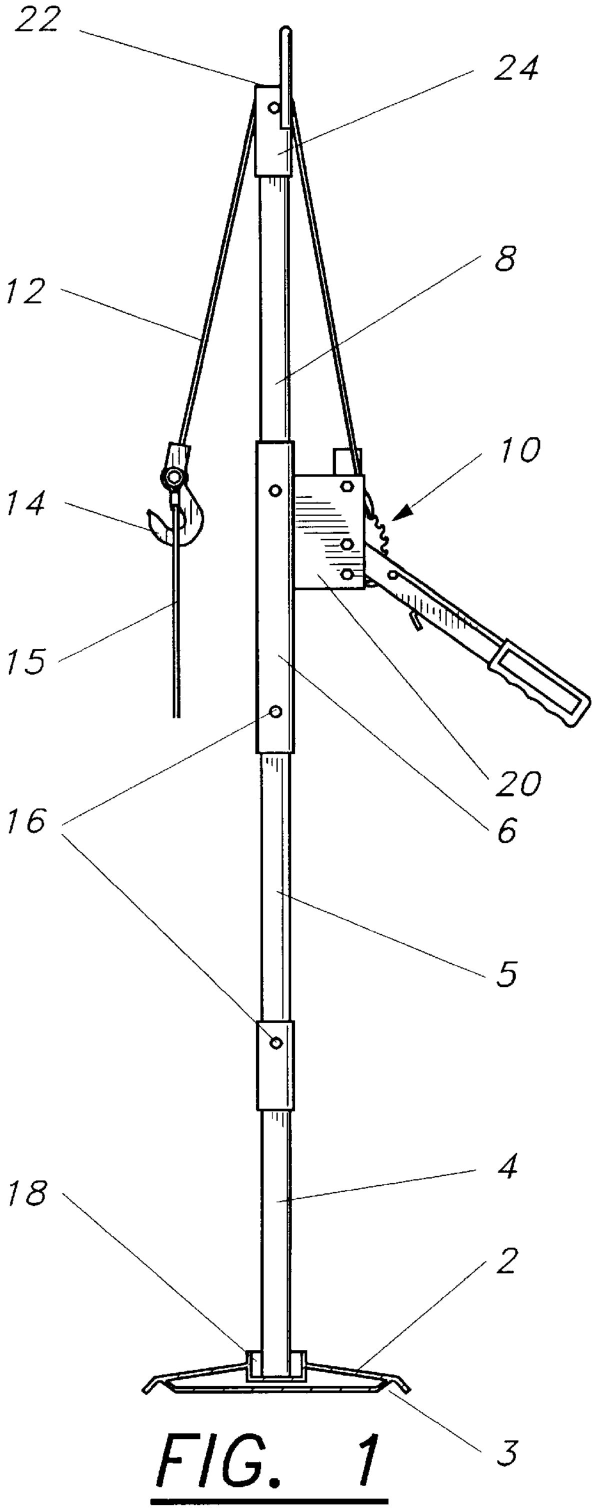
FIG. 1 is a side elevational view of a lifting mechanism is accordance with the present invention and FIG. 2 is a partial side view of a second embodiment of the base plate for use in the lifting mechanism of the present invention.

With reference to the drawing, the following is a description of a specific embodiment of the lifting mechanism of the present invention for use in getting a snowmobile unstuck. The lifting mechanism, as shown, comprises a base plate 2, a lower section 4, a first middle section 5, a second middle section 6, an upper section 8, and a ratchet assembly 10 with a cable 12 and hook member 14 with, optionally, cable 15 for safety. The upright sections 4, 5, 6 and 8 are designed for easy disassembly and assembly by hand and without use of any tools. Sections 4, 5 and 8 can be a good quality tubular steel or aluminum of one and one-fourth inch and section 6 about one and one-half inch in diameter so that the ends of sections 5 and 8 smoothly fit within section 6 and are arrested by pins or stops 16. The bottom end of section 5 is provided with a sleeve or coupling of about one and one-half inch diameter so that is removably but securely joins with the top end of section 4. The base plate 2 is flat and designed to be supported by packed snow. It can be circular or square of about twelve inches. The base plate at its outer edge has a channel or groove 3 which provides stability of the plate in snow. This is best seen in FIG. 1. The base plate at the center thereof has a receptacle or pocket 18 for removably receiving the lower end of section 4. It is to be noted that the inner diameter (I.D.) of pocket 18 is larger that the outer diameter (O.D.) of section 4. In the embodiment shown, the I.D. of pocket 18 is two inches, which permits the user to swing the snowmobile sideways after it has been lifted up and above the surrounding snow level. In other words, this flexible arrangement of pocket 18 and the lower end of section 4 allows the assembled sections 4, 5, 6 and 8 (vertical support post) to tilt sideways at an angle with not very much effort even though said sections are bearing the weight of the snowmobile after it has been ratcheted up and above the snow. Hook or bracket member 14 can be attached to, for example, the front or rear bumper of the snowmobile. In this way, a single person is able to get his machine unstuck, which would otherwise be generally physically impossible without assistance.

The second middle section 6 has securely attached to it ratchet assembly 10 by use of bracket member 20. The bracket member can be secured to the wall of section 6 as by welding or bolting. The ratchet assembly can be lightweight, such as about 2000 pounds capacity or heavier. The wire cable 12 should be of similar capacity.

In the embodiment shown, the upper end of section 8 is provided with a small pulley assembly 22 through which cable 12 is threaded to assist in ease of operation when lifting the snowmobile. The pulley assembly including a protective cover can be secured permanently or, as in FIG. 1, removably affixed to cap 24 which fits over the upper end of section 8.

Figure 2:
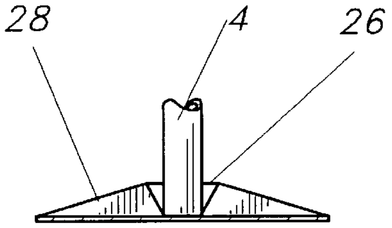

In a second embodiment of the base plate member shown in FIG. 2, the base plate 28 is provided with a pocket 26 wherein the walls of the pocket are tapered. This tapering provides a little more flexibility when assembled sections 4, 5, 6 and 8 are tilted to move the lifted snowmobile sideways.

The number of sections of the vertical support post is four as shown in FIG. 1. This has been found convenient for storage and packing on most snowmobiles. The number of sections is not fixed and can range from a single section post to a plurality of a greater or lesser than four sections.

What is claimed is:

1. A hand portable lifting mechanism that stows compactly and conveniently on a snowmobile, said lifting mechanism being operable by hand by a single person for use in freeing a snowmobile that is stuck in the snow, which comprises: a base plate; an elongated, straightsupport post having its bottom end removably and freely positioned on and at about mid-point and perpendicular to said base plate, said post having a plurality of sections which are removably connected end to end; and a ratchet assembly, mounted on one of said post sections, having a cable and a hook at the end of the cable for removable attachment to a snowmobile, said cable being supported at the upper end of said post whereby said snowmobile is lifted when the ratchet assembly is activated, said post being movable sideways at an acute angle relative to the base plate when the snowmobile has been lifted.

2. The lifting mechanism according to claim 1 wherein said base plate has a groove in the bottom surface which runs along the outer edge of the plate.

3. The lifting mechanism according to claim 1 wherein said post has a lower section, a first middle section, a second middle section and a top section.

4. The lifting mechanism according to claim 3 wherein each section is of substantially equal length and the ratchet assembly is mounted on the second middle section.

5. The lifting mechanism according to claim 4 wherein said top section has a pulley at its upper end for receiving said cable.

6. A hand portable lifting mechanism that stows compactly and conveniently on a snowmobile, said lifting mechanism being operable by hand by a single person for use in freeing a snowmobile that is stuck in the snow, which comprises: a base plate; an elongated, straight support post having its bottom end removably and freely positioned on and at about mid-point and perpendicular to said base plate, said post having a plurality of sections which are removably connected end to end; and a ratchet assembly, mounted on one of said post sections, having a cable and a hook at the end of the cable for removable attachment to a snowmobile, said cable being supported at the upper end of said post whereby said snowmobile is lifted when the ratchet assembly is activated, said base plate having a receptacle for cooperatively receiving the bottom end of said post, said receptacle prmitting the post to tilt at an acute-angle when the snowmobile has been lifted.

* * * * *